United States Patent [19]
McEnnan et al.

[11] Patent Number: 6,138,061
[45] Date of Patent: Oct. 24, 2000

[54] ONBOARD ORBIT PROPAGATION USING QUATERNIONS

[75] Inventors: James J. McEnnan, Gardena; Jennifer L. Warner, Los Angeles, both of Calif.

[73] Assignee: Hughes Electronics Corporation, El Segundo, Calif.

[21] Appl. No.: 08/844,346

[22] Filed: Apr. 18, 1997

[51] Int. Cl.$^7$ .............................. B64G 1/36; G01C 21/00
[52] U.S. Cl. ........................ 701/13; 244/168; 244/165; 244/166; 244/173; 244/176; 244/164; 244/170; 244/171
[58] Field of Search .............................. 701/13; 244/168, 244/165, 166, 173, 176, 164, 170, 171

[56] References Cited

U.S. PATENT DOCUMENTS

| | | | |
|---|---|---|---|
| 4,883,244 | 11/1989 | Challoner et al. | 244/166 |
| 5,183,225 | 2/1993 | Forward | 244/168 |
| 5,212,480 | 5/1993 | Ferro | 244/165 |

OTHER PUBLICATIONS

S.P. Altman, "A Unified State Model of Orbital Trajectory and Attitude Dynamics", System Development Corporation, Santa Monica, California; Sep. 22, 1971).

*Primary Examiner*—William A. Cuchlinski, Jr.
*Assistant Examiner*—Olga Hernandez
*Attorney, Agent, or Firm*—Georgann S. Grunebach; M. W. Sales

[57] ABSTRACT

A method for controlling orbiting spacecraft uploads a plurality of parameters to an onboard processor, the parameters including a plurality of quaternion elements describing an inertial to orbit reference frame, and including radial position, radial velocity and angular rate of the spacecraft. Parameters are input for processing one of a plurality of propagation algorithms, preferably calculating said propagation algorithms with the uploaded parameters, computing enhanced time of day vectors, and computing ground time of day angles from the enhanced time of day vectors for adjusting the payload pointing angle, such as an antenna pointing angle, of the satellite. Preferably, the calculating step comprises integrating an orbital state vector with a second order Runge-Kutta integration algorithm. In addition, enhanced time of day fault processing provides an internal check on integration accuracy and is checked every time of day update. Preferably, quaternion normalization deviation from unity shall be compared to commandable threshold values in the fault processing.

17 Claims, 5 Drawing Sheets

ONBOARD ORBIT PROPAGATION USING QUATERNIONS

GOVERNMENT RIGHTS STATEMENT

This invention was made with government support. The government has certain rights to this invention.

TECHNICAL FIELD

This invention relates to inertial pointing control of satellites by onboard processing including computing the nadir vector-as a function of instantaneous spacecraft position.

BACKGROUND ART

There are three principal methods that may be used for onboard computation of the azimuth and elevation of the Earth relative to the spacecraft. Each of these methods has certain advantages and disadvantages which apply in different cases. Moreover, the accuracy obtained with a particular method depends on the orbit.

Direct expansion of the azimuth and elevation can be determined as functions of time based on curve fits to a ground computer's processing of a "true" azimuth and elevation. However, direct polynomial expansion of the azimuth and elevation is the least flexible of the known methods, but it is simpler to implement onboard a spacecraft, and spacecraft processor throughput requirements are minimal.

The method of general perturbations involves series expansions that are developed for the classical orbital elements, which are then used with Kepler's equation to provide the position of the spacecraft at the desired time. The Kepler orbit generator is also potentially capable of accounting for secular perturbations but, in practice, the number and complexity of the corrections may become unwieldy in some cases. Accordingly, as the need for improved pointing accuracy requires consideration of additional corrections, the limits of onboard processing limit the value of this method.

In a method of special perturbations, the spacecraft dynamical equations of motion are integrated directly to determine the instantaneous position. However, the use of traditional three position/three velocity integration to propagate orbital equations of motion causes singular elements that cause special processing requirements for certain conditions, is not normalized to permit self-testing, checking that proper integration is performed without runaway, and requires complicated transformation from inertial to orbital coordinates. In addition, it requires solutions with trigonometric functions or of non-linear equations that require substantial processing time and additional code. As a result, this method forces use of the simplest form representative of the orbital state and does not permit adjustments for special case phenomena.

As a result, prior known implementations of the onboard computation of azimuth and elevation of the earth relative to the spacecraft have employed some form of either the direct expansion method or the method of general perturbations described above. Hughes spacecraft such as Intelsat VI and HSA10 use a simple form of the direct expansion method to derive the platform pointing profile that maintains earth-center pointing, using sun as the inertial reference. The method generates adjustments to the desired sun-earth angle using a linear fit approximation to the orbit. However, the resulting accuracy of this method is limited. Polynomial fits of higher order could be used to increase accuracy but have the disadvantages that a large number of parameter uploads to the spacecraft are required and a great deal of ground processing is also required. In addition, such calculations are not robust since small errors in the coefficients may result in large pointing errors, and they are not very flexible as different orbits may require different forms for the azimuth and elevation expansions. Furthermore, the calculations are difficult to implement if the attitude precession is not small.

Two Hughes HS-601 spacecraft for EHF and UHF communication employ simple onboard Kepler orbit propagators to generate orbital position and derive spacecraft-to-earth target vector. The EHF spacecraft propagates mean anomaly based on the difference between system time and epoch time, given periodic upload of the standard orbital elements, the mean anomaly rate, and the orbital drift rate. This implementation uses a power series expansion solution for Kepler's equation which assumes small orbital eccentricity. The UHF spacecraft assumes a simple elliptical orbit and uses an Adams-Bashforth integration scheme to propagate orbital position and orbit height. The earth line in earth centered inertial (ECI) coordinates is then determined from the orbit location and a predetermined transformation matrix from an ECI frame to an orbit frame centered in the spacecraft.

The accuracy resulting from the Kepler orbit propagators, while improved over the linear approximation, is still limited, especially near perigee for more highly elliptical orbits. Although increased accuracy may be achieved using this approach, the implementation would be computation intensive, involving trigonometric functions and the solution of non-linear equations.

SUMMARY OF THE INVENTION

A real-time processor for real-time processor-based quaternion integration onboard a spacecraft employs an ephemeris propagation algorithm that has been developed to determine the inertial position of a spacecraft relative to the earth. Given the periodic upload of a 7-element orbital state vector provided by means of ground commands, the algorithm is based on the method of special perturbations. In the method, the equations of motion of the center of mass of the spacecraft, craft, which is acted upon by the Earth's gravitational field including oblateness effects, are integrated directly to determine the instantaneous position. The formulation uses quaternion propagation of the transformation from inertial to orbital coordinates, together with scalar equations describing the radial position (distance), radial rate and the angular rate, and provides a convenient parameterization and an economic representation of the transformation for onboard implemention. Thus, unlike previous methods practiced, the present invention employs a non-traditional paradigm shift from inertial frame to orbital frame for determining the orbital state position and velocity.

In the method of special perturbations using quaternions, the spacecraft dynamical equations of motion, the derivative of orbital state as measured by the forces on the spacecraft, are integrated directly to determine the instantaneous position and velocity. In general, this method has the advantages over previous methods that it is general and flexible, since the method provides reasonably accurate results for any orbit type. The method is reasonably robust as small errors should have small effects. In addition, few parameters are required to be uploaded to the spacecraft, and additional ground processing and corresponding communication requirements and delays are minimal. Specific advantages of the quaternion-based formulation of special perturbations are obtained over the traditional position/velocity integration or other methods used to propagate orbital equations of motion. There are no singular elements, and a simple internal check on integration accuracy for error evaluation is provided, since the quaternion is normalized to unity. In addition, the transformation from inertial to orbital coordinates is readily obtained, and the method does not require trigonometric functions or the solution of non-linear equations.

In general, the state integration using quaternion elements is potentially the most accurate and flexible of the methods described since it automatically includes the principal secular corrections to the orbit. The value of this algorithm is that it is conceptually simple to implement, yet general enough to be used for any type of orbit while resulting in improved accuracy over existing onboard orbit propagation schemes. In addition, higher order gravitational effects could be incorporated in the algorithm for increased accuracy, without minimizing the advantages of the current implementation. As a result, the present invention is well adapted for improving antenna or other payload pointing accuracy to small fractions of a degree, for example, 20–30 times the previously available accuracy. Accordingly, the pointing system is well adapted for use with real-time voice communications, particularly in circumstances where communications are continued by switching stations during a conversation.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF THE PREFERRED EMBODIMENT

A real-time onboard processor employs an ephemeris propagation algorithm in a method that has been developed to determine the inertial position of a spacecraft 12 relative to the earth 14. The spacecraft is given a periodic upload of a 7-element orbital state vector provided by means of ground commands from a ground station 16 (FIG. 1b), and processes the algorithm based on the method of special perturbations. In the method, the equations of motion of the center of mass of the spacecraft, which is acted upon by the Earth's gravitational field including oblateness effects, are integrated directly to determine the instantaneous position. The formulation uses quaternion propagation of the transformation from inertial to orbital coordinates, together with scalar equations describing the radial distance and rate and the angular rate, and provides a convenient parameterization for onboard implementation.

Upon receipt of a new ground commanded initial state, the spacecraft processor preferably propagates the state vector in real-time using a second order Runge-Kutta integration algorithm. The spacecraft position described as an inertial reference and the corresponding nadir vector $\hat{E}$, a unit vector obtained by algebraic calculation, is simply obtained at any time from the orbital state vector.

Enhanced Time-of-Day Software Processing Requirements

Figure 2:
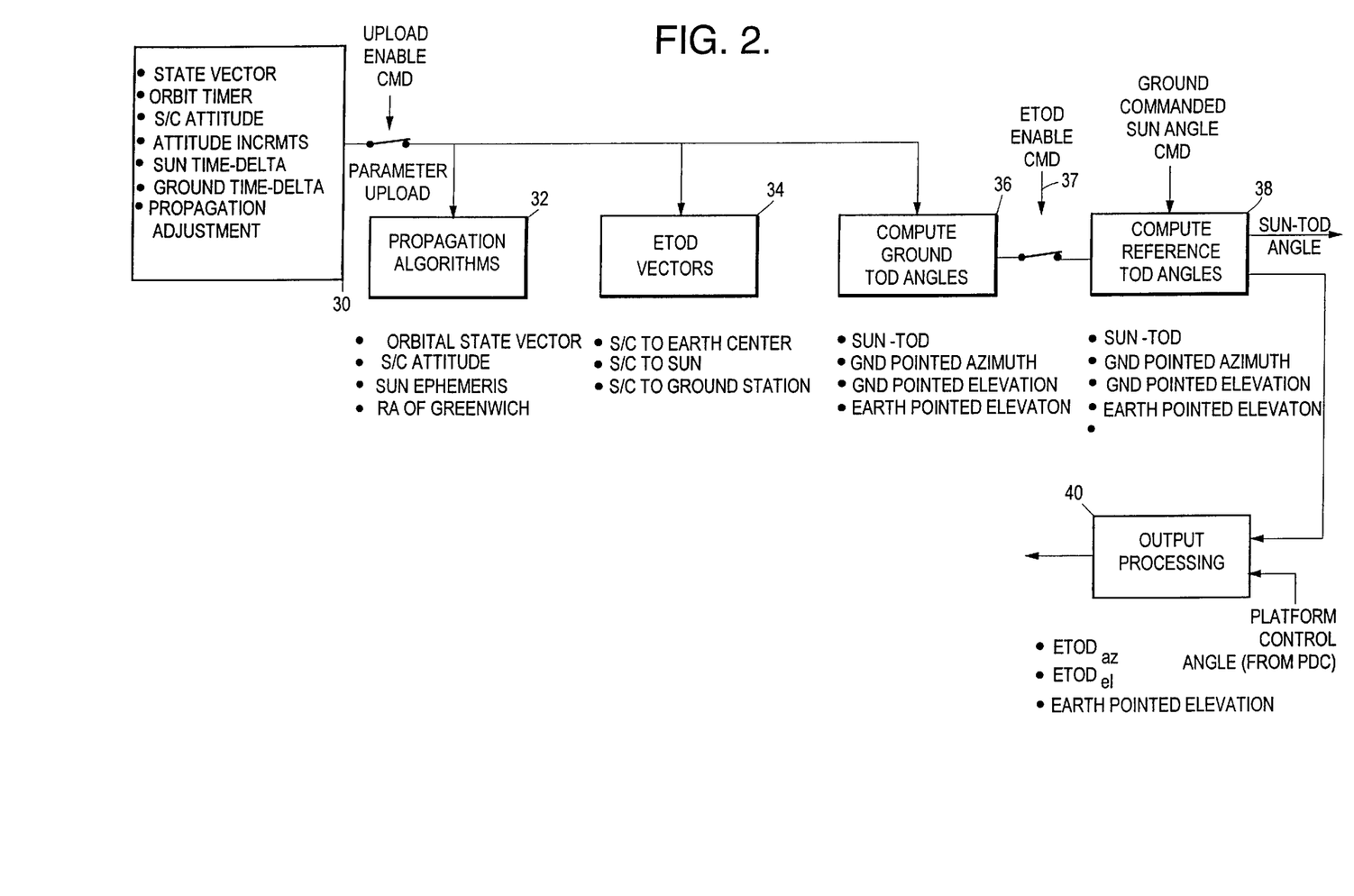
FIG. 2 is a flow diagram of the data processing in the system shown in FIG. 1.

In the preferred embodiment, four (4) propagation algorithms at 32 which use double precision accuracy are used to compute the enhanced time of day (ETOD) vectors. The first vector is the 7-element orbital state vector which shall be propagated using a second order Runge Kutta integration algorithm and shall be updated once every time of day (TOD) update period. The TOD update period is ground commandable.

The 7-element orbital state vector is defined as follows:

$$\tilde{x} = \begin{bmatrix} x_1 \\ x_2 \\ x_3 \\ x_4 \\ x_5 \\ x_6 \\ x_7 \end{bmatrix} = \begin{bmatrix} q_1 \\ q_2 \\ q_3 \\ q_4 \\ r \\ v \\ w \end{bmatrix} \quad (1)$$

where:

$q_n$=four ground commandable elements of a quaternion r=ground commandable spacecraft position magnitude v=ground commandable spacecraft radial velocity magnitude w=ground commandable spacecraft orbital rate magnitude.

The Runge-Kutta algorithm is defined as follows:

$$d\tilde{x}/dt = \dot{\tilde{x}} = f(\tilde{x})$$

$$\tilde{x}(t+dt) = \tilde{x}(t) + \frac{1}{2}\Delta t(\tilde{f}_0 + \tilde{f}_{1a})$$

where $\tilde{f}_0 = \tilde{f}(\tilde{x}(t))$ $\tilde{f}_{1a} = \tilde{f}(\tilde{x}(t) + \Delta t \cdot \tilde{f}_0)$ t=current time Δt=ground commandable TOD update time delta (default 1 second)

dt refers to the TOD update period (number of processor real-time interrupts (RTI's) per update), where:

NUM$_{RTI}$=ground commandable number of RTI's per ETOD propagation step (Note; typically, $dt$=NUM$_{RTI}$×0.032768 sec).

f(x) is determined from the state vector as follows:

$$f_1 = \frac{1}{2}(w_3 x_2 - w_2 x_3 + w_1 x_4)$$

$$f_2 = \frac{1}{2}(-w_3 x_1 + w_1 x_3 + w_2 x_4)$$

$$f_3 = \frac{1}{2}(w_2 x_1 - w_1 x_2 + w_3 x_4)$$

$$f_4 = \frac{1}{2}(-w_1 x_1 - w_2 x_2 - w_3 x_3)$$

$$f_5 = x_6$$

$$f_6 = x_7^2 x_5 - a_3$$

$$f_7 = (-2 x_7 x_6 + a_1)/x_5$$

where auxiliary vectors are defined:

$$\hat{k} = \begin{bmatrix} k_1 \\ k_2 \\ k_3 \end{bmatrix} = \begin{bmatrix} 2(x_1x_3 - x_2x_4)/q^2 \\ 2(x_2x_3 + x_1x_4)/q^2 \\ (-x_1^2 - x_2^2 + x_3^2 + x_4^2)/q^2 \end{bmatrix} \quad (2)$$

$$\vec{a} = \begin{bmatrix} a_1 \\ a_2 \\ a_3 \end{bmatrix} = \frac{g_0}{x_5^2}\begin{bmatrix} (h_0/x_5^2)(2k_3k_1) \\ (h_0/x_5^2)(2k_3k_2) \\ 1 - (h_0/x_5^2)(3k_3^2 - 1) \end{bmatrix} \quad (3)$$

$$\vec{w} = \begin{bmatrix} w_1 \\ w_2 \\ w_3 \end{bmatrix} = \begin{bmatrix} 0 \\ -x_7 \\ a_2/(x_7 x_5) \end{bmatrix} \quad (4)$$

$g_0$, $h_0$, $R_e$=constants and the quaternion normalization is defined as:

$$q^2 = x_1^2 + x_2^2 + x_3^2 + x_4^2$$

The transverse components of the spacecraft attitude are preferably incremented at perigee, by a ground commandable increment, that is dribbled in at a reprogrammable rate. The orbit period is also ground commandable. The following components are incremented once per orbit:

a) inertial attitude transverse component 1:

$$A_{1(n)} = A_{1(n-1)} + \Delta A_1$$

b) inertial attitude transverse component 2:

$$A_{2(n)} = A_{2(n-1)} + \Delta A_2$$

where:

$A_1$, $A_2$ are computed at initialization as functions of ground commandable parameters $\alpha_0$, $\delta_o$ $\Delta A_1$, $\Delta A_2$=ground commandable increments which shall be dribbled in at a reprogrammable rate, $A_{drib}$.

A ground commandable orbit period timer is used to calculate perigee time. The dribble commences at perigee time and continues until the entire increment has been summed in.

The sun ephemeris is propagated once every TOD update period. The following components shall be computed:
a) Sun time delta $$T_{s(n)} = T_{s(n-1)} + \Delta t$$

where $T_s$=ground commandable sun time delta $\Delta t$=TOD update time delta b) Longitude of the sun $$L_s = L_0 + w_s*(T_{s(n)}) + e_1*\sin M + e_2*\sin 2M,$$

where $M = M_0 + n*(T_{s(n)})$ $M_0$, $L_0$—ground commandable parameters n, $w_s$, $e_1$, $e_2$=constants The right ascension of Greenwich is propagated at 32 once every TOD update period. The following parameters are updated each period:
a) ground time delta $$T_{G(n)} = T_{G(n-1)} + \Delta t$$

where $T_G$=ground commandable ground time delta b) right ascension of Greenwich $$\alpha_G = \alpha_G(0) + \Omega*T_G, \text{ modulo } 360$$

where $\alpha_{G(0)}$=ground commandable parameter $\Omega$=constant

Four calculated ETOD vectors are computed at 34 as defined below and used to derive the computed TOD angles.

The vector from spacecraft to earth center, a nadir vector in terms of q, is a function of the elements of the orbital state vector and is updated each TOD update period:

$$\hat{E} = \begin{bmatrix} E_1 \\ E_2 \\ E_3 \end{bmatrix} = \begin{bmatrix} 2(x_1x_3 + x_2x_4)/q^2 \\ 2(x_2x_3 - x_1x_4)/q^2 \\ (-x_1^2 - x_2^2 + x_3^2 + x_4^2)/q^2 \end{bmatrix} \quad (5)$$

Figure 1A:
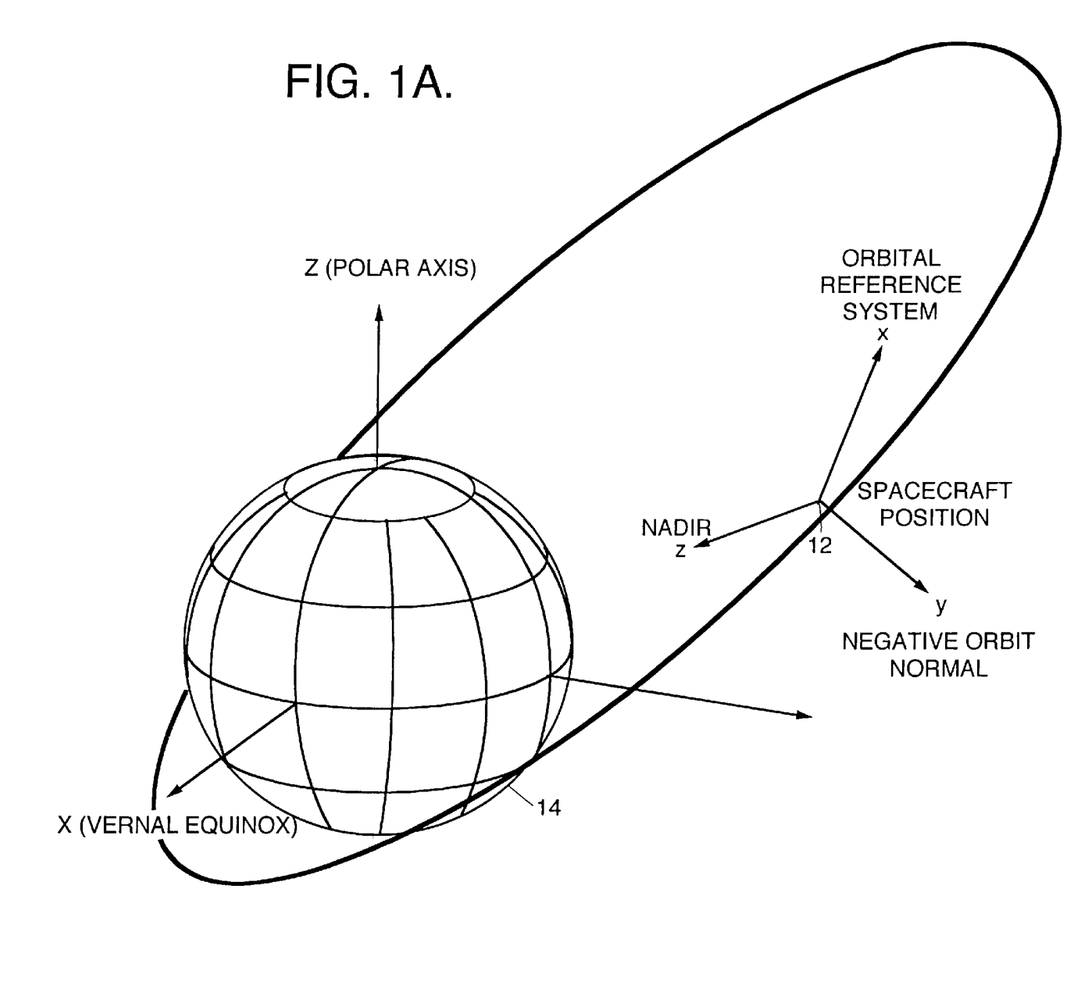
FIGS. 1a and 1b are diagrammatic views of a spacecraft in orbit about the earth and including an onboard processor for determining its position in accordance with the present invention.
Figure 1B:
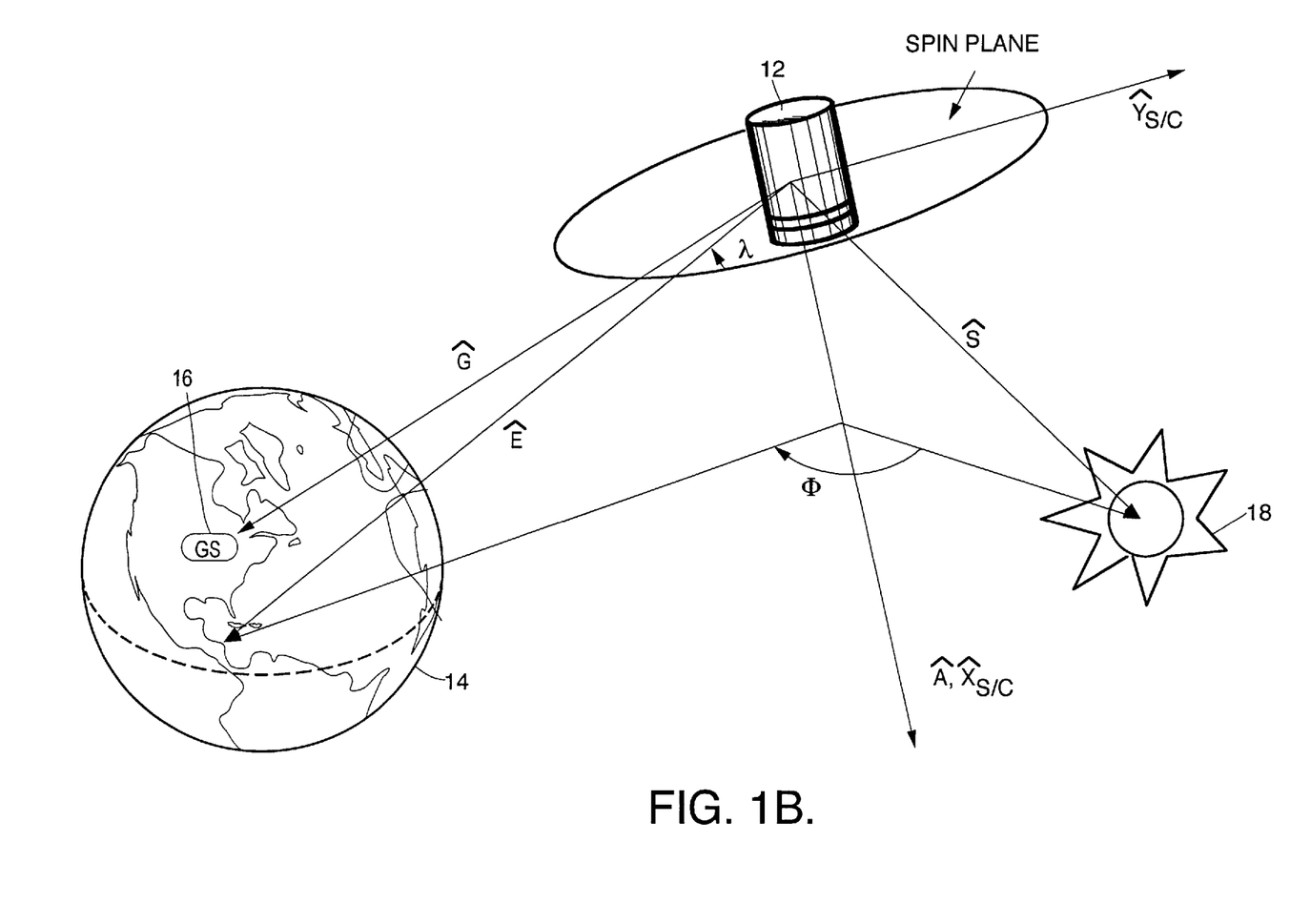

Vector from spacecraft 12 to sun 18 is a function of sun ephemeris, as determined in previously known methods, and is updated each TOD update period:

$$\hat{S} = \begin{bmatrix} S1 \\ S2 \\ S3 \end{bmatrix} = \begin{bmatrix} \cos L_s \\ \cos\epsilon \cdot \sin L_s \\ \sin\epsilon \cdot \sin L_s \end{bmatrix} \quad (6)$$

where $\in$=constant

The vector from spacecraft 12 to ground station 16, known once the nadir vector is known, is updated each TOD update period:

$$G_1 = \frac{x_5 E_1 + R_e u_1}{G_{den}} \quad u_1 = \cos\alpha_t \cdot \cos\delta_t \quad (7)$$

$$G_2 = \frac{x_5 E_2 + R_3 u_2}{G_{den}} \quad u_2 = \sin\alpha_t \cdot \cos\delta_t$$

$$G_3 = \frac{x_5 E_3 + R_e u_3}{G_{den}} \quad u_3 = \sin\delta_t$$

$$G_{den} = \sqrt{x_5^2 + R_3^2 + 2x_5 R_3(E_1 u_1 + E_2 u_2 + E_3 u_3)}$$

where $R_e$=constant $\alpha_t = \alpha_G + \lambda$ $\delta_t = \phi$ $\phi$=ground commandable latitude of ground station $\lambda$=ground commandable longitude of ground station Spacecraft spin axis attitude vector ($\hat{A}$) is a function of the transverse components of spacecraft attitude and is updated at perigee. An update shall occur at each TOD update period during the attitude increment dribble:

$$\hat{A} = \frac{1}{\sqrt{A_1^2 + A_2^2 + A_3^2}} \begin{bmatrix} A_1 \\ A_2 \\ A_3 \end{bmatrix} \quad (8)$$

where $A_1$, $A_2$ and $A_3$ are set at parameter initialization as:

$A_1 = \cos\alpha_o \cos\delta_o$ $A_2 = \sin\alpha_o \cos\delta_o$ $A_3 = \sin\delta_o$ and $\alpha_o$=ground commandable right ascension of spacecraft spin axis $\delta_o$=ground commandable declination of spacecraft spin axis Four (4) computed time of day angles are calculated at 36 from the ETOD vectors every TOD update period.

The Sun-TOD angle is a function of the spacecraft to earth center vector (E), the spacecraft to sun vector (S), the spacecraft spin axis attitude vector (A) and the rotation angle from the +Y rotor axis to the sun sensor boresight ($\Phi_o$), $\Phi_o$ shall be ground commandable. The Sun-TOD angle is computed as follows:

$$\Phi_{sunTOD} = MOD\left(360° - \left(\Phi_o + atan\left[\frac{A \cdot \langle SxE \rangle}{S \cdot E - \langle S \cdot A \rangle \langle E \cdot A \rangle}\right]\right)\right) \quad (9)$$

where atan angle is from −180 to 180° (in the proper is quadrant) and $A \cdot (S \times E) = A_1(S_2 E_3 - S_3 E_2) + A_2 (S_3 E_1 - S_1 E_3) + A_3(S_1 E_2 - S_2 E_1)$ $S \cdot E - (S \cdot A) (E \cdot A) = S_1 E_1 + S_2 E_2 + S_3 E_3 - (A_1 S_1 + A_2 S_2 + A_3 S_3) (A_1 E_1 + A_2 E_2 + A_3 E_3)$ The ground pointed azimuth angle, $Gy_{az}$ is a function of the spacecraft to earth center vector ($\hat{E}$), the spacecraft spin axis attitude vector ($\hat{A}$) and spacecraft to ground station vector ($\hat{G}$). The $Gy_{az}$ angle shall be computed as follows:

$$Gy_{az} = atan\left[\frac{A \cdot \langle GxE \rangle}{G \cdot E - \langle G \cdot A \rangle \langle E \cdot A \rangle}\right] \quad (10)$$

where atan angle is from −180 to 180° (in the proper quadrant) and $A \cdot (G \times E) = A_1(G_2 E_3 - G_3 E_2) + A_2(G_3 E_1 - G_1 E_3) + A_3(G_1 E_2 - G_2 E_1)$ $G \cdot E - (G \cdot A) (E \cdot A) = G_1 E_1 + G_2 E_2 + G_3 E_3 - (A_1 G_1 + A_2 G_2 + A_3 G_3) (A_1 E_1 + A_2 E_2 + A_3 E_3)$ The ground pointed elevation angle, $Gy_{el}$ is a function of the spacecraft spin axis attitude vector (A) and spacecraft to ground station vector (G). The $Gy_{el}$ angle shall be computed as follows:

$Gy_{el} = acos (A \cdot G) = acos (A_1 G_1 + A_2 G_2 + A_3 G_3)$

The Earth pointed elevation angle, $Ey_{el}$ is a function of the spacecraft to earth center vector ($\hat{E}$) and the spacecraft spin axis attitude vector (A). The $Ey_{el}$ angle shall be computed as follows:

$Ey_{el} = asin (A \cdot E) = asin (A_1 E_1 + A_2 E_2 + A_3 E_3)$

Four (4) Reference Time of Day angles are updated at every TOD update period when ETOD is enabled:

1) Reference Sun-TOD angle, Ref $\Phi_{sunTOD}$
2) Reference ground pointed azimuth angle, Ref $Gy_{az}$
3) Reference ground pointed elevation angle, Ref $Gy_{el}$
4) Reference earth pointed elevation angle, Ref $Ey_{el}$ The Reference Sun-TOD angle is ground commandable. The command called Ground Commanded Sun Angle has negative quantization (i.e., the Reference Sun-TOD angle shall be set to 360° minus the commanded angle).

The ETOD function is enabled or disabled by ground command. When enabled, Reference TOD angles are updated to the ground TOD angles. When disabled, Reference TOD angles shall hold the last reference TOD angles, and ETOD fault processing occurs prior to any Reference angle updates.

Enhanced time of day (ETOD) fault processing at 38 provides an internal check on integration accuracy and is checked every TOD update period. The fault processing is defined as follows.

Quaternion normalization deviation from unity is compared to a commandable threshold $|q^2-1| \leq q_{err}$ where $q^2 = x_1^2 + x_2^2 + x_3^2 + x_4^2$ $q_{err}$=commandable constant (default=$10^{-6}$)

If the threshold is exceeded, a telemetry flag is set.

The ETOD fault response is enabled or disabled by ground command at 37. If enabled, Reference TOD angles shall hold the last reference TOD angles, until fault flag is cleared by ground. If disabled, all ETOD processing shall continue normally. The flag is cleared by ground command.

The following ETOD angles are used for calculating payload angles and spacecraft orientation.

1) ETOD azimuth angle, $ETOD_{az}$, computed as follows:

$$ETOD_{az} = asin\left[\frac{\sin(Gy_{el})\sin(Gy_{az})}{\cos(\alpha_a)}\right] \text{ where } Gy_{az} = Gy_{ax} + \theta_{cmd} \quad (11)$$

$\theta_{cmd}$ is the platform control angle from PDC processing.

2) ETOD elevation angle, $ETOD_{el}$, computed as follows:

$$ETOD_{el} = atan\left(\frac{A}{-B}\right) - asin\left(\frac{X}{\sqrt{A^2 + B^2}}\right) \quad (12)$$

where atan angle is from −180 to 180° (in the proper quadrant) and $Gy_{az}$ and $Gy_{el}$ refer to Reference Time of Day angles
$A = \cos(Gy_{el}) \cos(\alpha_b) - \cos(Gy_{az}') \sin(Gy_{el}) \sin(\alpha_b)$
$B = -\cos(Gy_{el}) \sin(\alpha_b) - \cos(Gy_{az}') \sin(Gy_{el}) \cos(\alpha_b)$
$X = \cos(\alpha_c)$ and $\alpha_a$, $\alpha_b$, $\alpha_c$ are constants.

3) Earth pointed elevation angle, Ref $Ey_{el}$

Parameter initialization is based on ground commandable parameters. When a new TOD parameter set is commanded, the data shall be stored in memory and the active parameters changed only at the enable time. The enable time is determined by a ground commandable flag. (Note: the upload enable flag will be loaded in a stored command buffer to execute at a particular clock time).

At parameter initialization 44 (FIG. 3a) (and unit reset), the stored orbital parameters are used to overwrite the active parameter states; the initial attitude vector ($\hat{A}$), is computed from ground commanded parameters, $\alpha_o$ and $\delta_o$; all timing parameters are reset; and ETOD propagation, computations and transfers proceed normally following reset. The following parameters define the initialization parameter set:

| ETOD Commandable Initialization Parameter Set | | |
|---|---|---|
| Parameter | Description | Precision |
| $q_1$ | quaternion 1 | double |
| $q_2$ | quaternion 2 | double |
| $q_3$ | quaternion 3 | double |

-continued

ETOD Commandable Initialization Parameter Set

| Parameter | Description | Precision |
|---|---|---|
| $q_4$ | quaternion 4 | double |
| r | spacecraft position magnitude | double |
| v | spacecraft radial velocity magnitude | double |
| w | spacecraft orbital rate magnitude | double |
| $NUM_{RTI}$ | Number of RTI's per ETOD update | single |
| Torbit | Orbit period timer | single |
| $\Delta A_1$ | inertial attitude precession increment 1 | single |
| $\Delta A_2$ | inertial attitude precession increment 2 | single |
| $T_S$ | sun time-delta | double |
| $T_G$ | ground time-delta | double |
| $\alpha_o$ | right ascension of spin axis attitude | double |
| $\delta_o$ | declination of spin axis attitude | double |

The following parameters shall be ground commandable:

ETOD Commandable Parameters

| Parameter | Description | Precision |
|---|---|---|
| $\Delta t$ | TOD update time delta | single |
| $\Delta t_{orbit}$ | TOD orbit period (12 hr HEO, 24 hr GEO) | single |
| $M_0$ | Mean anomaly of sun at sun ref time | double |
| $L_0$ | Longitude of sun at sun ref time | double |
| $\alpha_{G0}$ | Right ascension of Greenwich at ground ref time | double |
| $\phi$ | Geodetic latitude of GS | double |
| $\lambda$ | Geodetic longitude of GS | double |
| $\Phi_o$ | Angle from $+Y_{rotor}$ to sun sensor boresight | double |
| ETOD enable | Enable/disable Reference ETOD angles | flag |
| Epoch time enable | Enable/disable epoch time processing | flag |
| ETOD fault ena | Enable/disable ETOD fault response | flag |
| $q_{err}$ | ETOD fault threshold | single |
| Ref $\Phi_{sunTOD}$ | Ground commanded sun angle | single |
| $\theta_{cmd}$ | Platform offset angle | single |
| $\Delta$plt ptg angle | Dribble increment for platform offset command | single |

The following parameters are reprogrammable:

ETOD Reprogrammable Parameters

| Parameter | Description | Precision |
|---|---|---|
| $A_{drib}$ | attitude increment dribble rate | single |

The following parameters are constants:

ETOD Constant Parameters

| Parameter | Description | Precision |
|---|---|---|
| n | mean motion of earth (deg/day) | double |
| $W_S$ | orbital rate of earth (about sun) | double |
| $e_1$ | eccentricity correction 1 for earth orbit | double |
| $e_2$ | eccentricity correction 2 for earth orbit | double |
| $\Omega$ | spin rate of earth | double |
| $\epsilon$ | obliquity of ecliptic | double |
| $g_0$ | gravitational constant | double |
| $R_e$ | equatorial radius of earth | double |
| $h_0$ | $(3/2)J_2Re^2$ | double |
| $\alpha_a, \alpha_b, \alpha_c$ | angles related to s/c geometry | single |

Figure 3A:
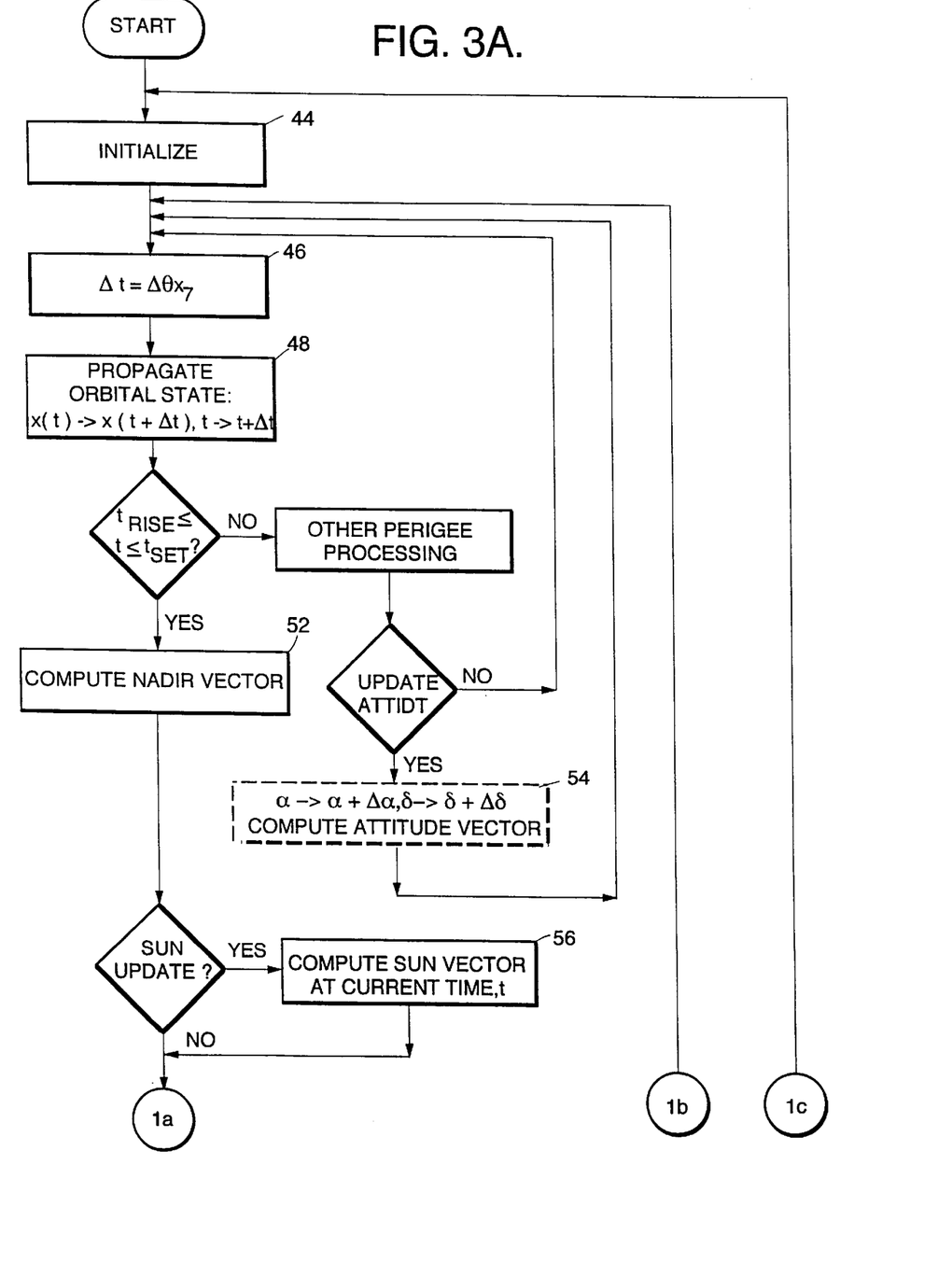
FIGS. 3a and 3b are a flow diagram of the onboard processing in the system of FIG. 1.
Figure 3B:
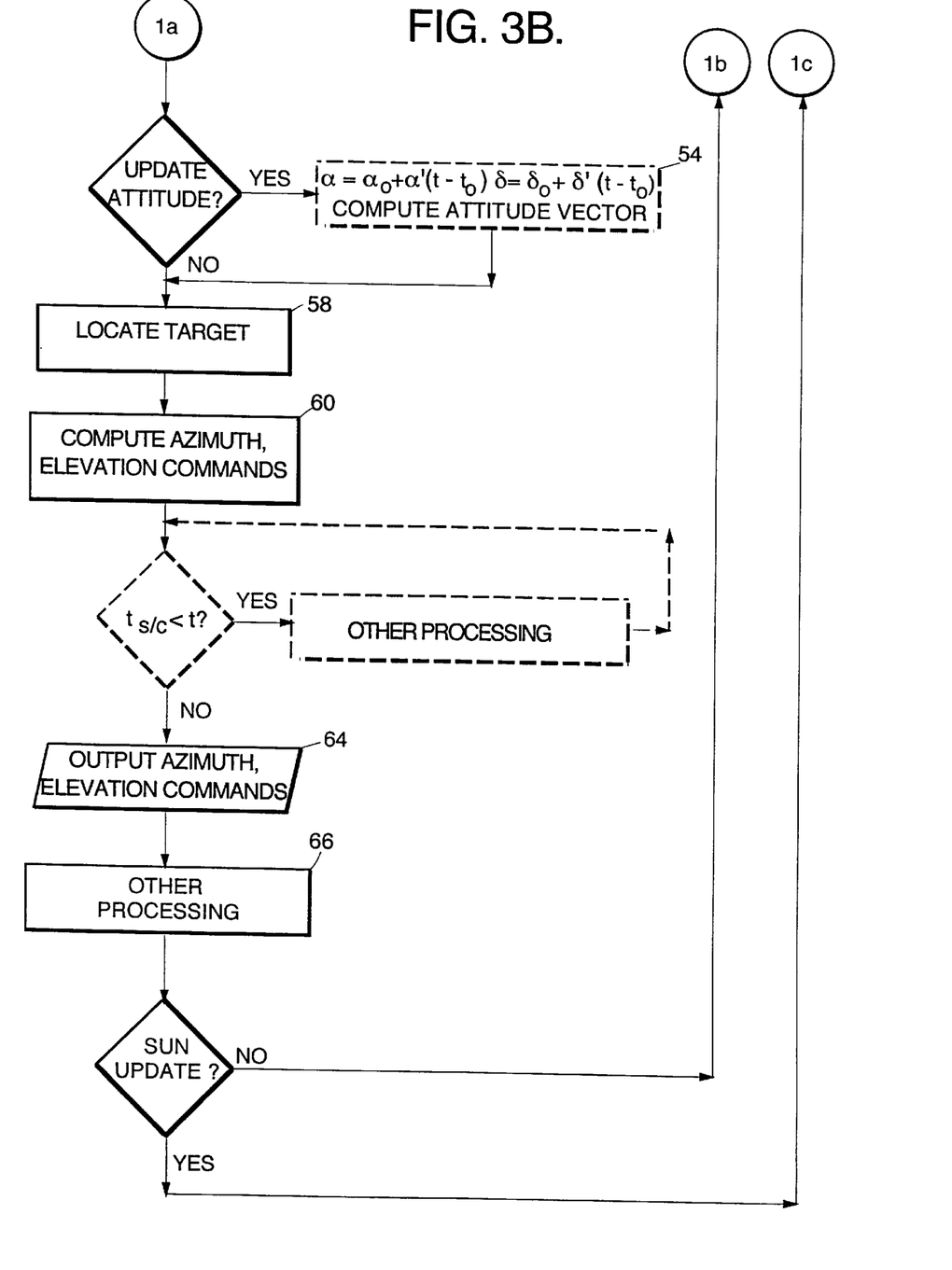

FIGS. 3a and 3b represent a possible flow diagram for the onboard implementation of the proposed algorithm. In this example, it is assumed that periodic revisions of the attitude and orbital state parameters are provided by means of ground commands. The expected interval between updates is on the order of 1–3 weeks. Upon receipt of a new initial state, the spacecraft processor is required to compute the corresponding platform azimuth and gimbal elevation pointing angles and output the appropriate mechanism commands. Thus, it is assumed that, after initialization, the platform azimuth and gimbal elevation angles are correct for the initial time, $t=t_0$. Additionally, unit vectors corresponding to the inertial position of the Sun and the spacecraft attitude are required to have been determined. However, it should be noted that, in the current implementation, the Sun ephemeris does not require reinitialization after start up.

Platform azimuth gimbal elevation angles for times greater than $t_0$ are determined according to the process described by the flow diagram. Detailed descriptions of the computations required in each block of the diagram are given in the following sections. Blocks which are outlined by a dashed line denote possible options which will be described in turn.

In the following, the geocentric inertial (GCI) coordinate system employed is the usual one in which the Z axis is along the polar axis of the Earth, positive toward the north, the X axis is toward the vernal equinox and the Y axis completes a right-handed orthogonal triad. The mean equator and equinox of date are assumed.

The inertial position of the spacecraft relative to the Earth is completely determined by an orbital state vector comprising seven elements. These elements are defined as follows.

Denote the inertial spacecraft position vector at given time, $t_0$, by $\vec{r}$ (km) and the corresponding velocity vector by $\vec{V}$ (km/sec).

The orbital angular rate vector is given by $\vec{\omega}=(\vec{r}\times\vec{V})/r^2$, where $r=|\vec{r}|$ is the magnitude of the position vector. Let $\omega=|\vec{\omega}|$ denote the magnitude of the orbital rate (rad/sec).

Define an orbital reference frame by means of three orthogonal unit vectors:

$$\hat{Z}_0=-\vec{v}/v$$

$$\hat{Y}_0=-\vec{\omega}/\omega$$

$$\hat{X}_0=\hat{Y}_0\times\hat{Z}_0 \quad (13)$$

Then the orthogonal matrix, C, describing the transformation from GCI to this orbital reference frame is given by:

$$C=\begin{bmatrix} C_{11} & C_{12} & C_{13} \\ C_{21} & C_{22} & C_{23} \\ C_{31} & C_{32} & C_{33} \end{bmatrix}=\begin{bmatrix} \hat{X}_0 \\ \hat{Y}_0 \\ \hat{Z}_0 \end{bmatrix}=\begin{bmatrix} X_{01} & X_{02} & X_{03} \\ Y_{01} & Y_{02} & Y_{03} \\ Z_{01} & Z_{02} & Z_{03} \end{bmatrix} \quad (14)$$

provided the unit vectors, $\hat{X}_0$, $\hat{Y}_0$, and $\hat{Z}_0$, are expressed in inertial coordinates.

The transformation represented by Equation (14) may also be completely characterized by means of four Euler symmetric parameters regarded as the components of a quaternion. The components of the quaternion, q, corresponding to the transformation C (14) comprise the first four components of the orbital state vector.

There are four possible ways to compute the quaternion components corresponding to the transformation C.

Explicitly, $$q_4 = \pm \frac{1}{2}(1 + C_{11} + C_{22} + C_{33})^{1/2} \quad (15)$$

$$q_1 = \frac{1}{4q_4}(C_{23} - C_{32})$$

$$q_2 = \frac{1}{4q_4}(C_{31} - C_{13})$$

$$q_3 = \frac{1}{4q_4}(C_{12} - C_{21})$$

or $$q_1 = \pm \frac{1}{2}(1 + C_{11} - C_{22} - C_{33})^{1/2} \quad (16)$$

$$q_2 = \frac{1}{4q_1}(C_{12} + C_{21})$$

$$q_3 = \frac{1}{4q_1}(C_{31} + C_{13})$$

$$q_4 = \frac{1}{4q_1}(C_{23} - C_{32})$$

or $$q_2 = \pm \frac{1}{2}(1 - C_{11} + C_{22} - C_{33})^{1/2} \quad (17)$$

$$q_1 = \frac{1}{4q_2}(C_{12} - C_{21})$$

$$q_3 = \frac{1}{4q_2}(C_{23} - C_{32})$$

$$q_4 = \frac{1}{4q_2}(C_{31} - C_{13})$$

or $$q_3 = \pm \frac{1}{2}(1 - C_{11} - C_{22} - C_{33})^{1/2} \quad (18)$$

$$q_1 = \frac{1}{4q_3}(C_{31} + C_{13})$$

$$q_2 = \frac{1}{4q_3}(C_{23} + C_{32})$$

$$q_4 = \frac{1}{4q_3}(C_{12} - C_{21})$$

In each case, the overall sign of the quaternion is arbitrary. Each of the expressions listed above is mathematically equivalent. However, numerical errors may be minimized by avoiding calculations in which the denominator is close to zero.

It may be noted that the magnitude of the quaternion, q, is nominally unity so that, $$q^2 = q_1^2 + q_2^2 + q_3^2 + q_4^2 = 1 \quad (19)$$

In terms of the preceding definitions, the orbital state vector, $\tilde{x}$, is given at time, $t_0$, by $$\tilde{x} = \begin{bmatrix} x_1 \\ x_2 \\ x_3 \\ x_4 \\ x_5 \\ x_6 \\ x_7 \end{bmatrix} = \begin{bmatrix} q_1 \\ q_2 \\ q_3 \\ q_4 \\ r \\ v \\ \omega \end{bmatrix} \quad (20)$$

where $v = \hat{r} \cdot \vec{V} = -\hat{Z}_O \cdot \vec{V}$ is the radial velocity.

It is expected that the computations described above for the determination of the initial orbital state vector will be performed on the ground. Only the seven components of the orbital state vector, $\tilde{x}$, and the time, $t_0$, are transmitted to the spacecraft. Assuming six significant figures, these parameters may be transmitted as single precision variables with no appreciable loss of accuracy.

The spacecraft orbital state is propagated onboard at 48 using a second order Runge-Kutta integration algorithm. The integration may employ a fixed time step, $\Delta t$, or a variable time step as shown at 46 in which $$\Delta t = \Delta \theta / \omega = \Delta \theta / x_7 \quad (21)$$

where $\Delta \theta$ is a fixed true anomaly angle. For the highly eccentric orbit (HEO) orbit, if a fixed time step is used, the suggested value is $\Delta t \approx 1$ (sec). If a variable time step is employed, the suggested value is $\Delta \theta \approx 0.001745$ (0.1 deg). Either option yields acceptable accuracy. However, the variable time step requires considerably fewer integration steps per orbit and, therefore, less processing time. For the geosynchronous orbit (GEO) orbit, there is no significant difference between the fixed and variable step approaches; the suggested time step is $\Delta t \approx 24$ (sec) or $\Delta \theta \approx 0.001745$ (0.1 deg).

The second order Runge-Kutta integration algorithm is defined as follows. Let $$\dot{\tilde{x}} = f(\tilde{x}) \quad (22)$$

denote the time derivative of the state vector. Note that the derivative function $\tilde{f}$, depends only on the state. Assuming the state is defined at time, t, the state at a subsequent time, $t + \Delta t$, is given by:

$$\tilde{x}(t+\Delta t) = \tilde{x}(t) + \frac{1}{2}\Delta t (f_0 + f_+) \quad (23)$$

where $$f_0 = f(\tilde{x}(t)) \quad (24)$$

and $$f_+ = f(\tilde{x}(t) + \Delta t\, f_0) \quad (25)$$

The orbital state derivative function $\tilde{f}$, is determined from the state vector, $\tilde{x}$, as follows. Define three auxiliary vectors, $\vec{k}$, $\vec{a}$ and $\vec{w}$, $$\hat{k} = \begin{bmatrix} k_1 \\ k_2 \\ k_3 \end{bmatrix} = \begin{bmatrix} 2(x_1 x_3 - x_2 x_4)/q^2 \\ 2(x_2 x_3 + x_1 x_4)/q^2 \\ (-x_1^2 - x_2^2 + x_3^2 + x_4^2)/q^2 \end{bmatrix} \quad (26)$$

$$\vec{a} = \begin{bmatrix} a_1 \\ a_2 \\ a_3 \end{bmatrix} = \frac{g_0}{x_5^2} \begin{bmatrix} (h_0/x_5^2)(2k_3 k_1) \\ (h_0/x_5^2)(2k_3 k_2) \\ 1 - (h_0/x_5^2)(3k_3^2 - 1) \end{bmatrix} \quad (27)$$

$$\vec{w} = \begin{bmatrix} w_1 \\ w_2 \\ w_3 \end{bmatrix} = \begin{bmatrix} 0 \\ -x_7 \\ a_2/(x_7 x_5) \end{bmatrix} \quad (28)$$

where $$q^2 = x_1^2 + x_2^2 + x_3^2 + x_4^2 \quad (29)$$

In equation (27), $g_0 = GM_e = 398600.5$ km$^3$/sec$^2$ is the Earth's gravitational constant and $h_0 = 3/2 J_2 R_e^2 = 66063.11$ km², where $J_2$ is the second order zonal harmonic coefficient and $R_e$ is the equatorial radius of the Earth. In terms of these quantities, the state derivative function is given by:

$$f_1 = \tfrac{1}{2}(w_3 x_2 - w_2 x_3 + w_1 x_4)$$

$$f_2 = \tfrac{1}{2}(-w_3 x_1 + w_1 x_3 + w_2 x_4)$$

$$f_3 = \tfrac{1}{2}(w_2 x_1 - w_1 x_2 + w_3 x_4)$$

$$f_4 = \tfrac{1}{2}(-w_1 x_1 - w_2 x_2 - w_3 x_3)$$

$$f_5 = x_6$$

$$f_6 = x_7^2 x_5 - a_3$$

$$f_7 = (-2 x_7 x_6 + a_1)/x_5 \qquad (30)$$

It may be noted that the quaternion normalization, $q^2$, defined above is nominally unity. Hence, the difference between $q^2$ and 1 may be used as an internal check of the integration accuracy. For reference, typically $|q^2-1| \leq 10^{-6}$. The maximum allowable value of the deviation from unity has not yet been determined.

The nadir vector, $\hat{E}$, a unit vector from the spacecraft toward the center of the Earth, is simply obtained at 52 from the orbital state vector. With $q^2$ defined by equation (29), $\hat{E}$ is given in inertial coordinates by:

$$\hat{E} = \begin{bmatrix} E_1 \\ E_2 \\ E_3 \end{bmatrix} = \begin{bmatrix} 2(x_1 x_3 + x_2 x_4)/q^2 \\ 2(x_2 x_3 - x_1 x_4)/q^2 \\ (-x_1^2 - x_2^2 + x_3^2 + x_4^2)/q^2 \end{bmatrix} \qquad (31)$$

Note that the proper normalization is maintained, independent of the value of $q^2$.

Over time, the spacecraft attitude changes due to external environmental torques. This attitude precession may have a substantial effect on the determination of the proper platform azimuth and gimbal elevation pointing angles.

The general character of the attitude precession at 54 depends on the orbit. For the HEO orbit, most of the attitude precession occurs near perigee, between set and rise. Between rise and set, on the other hand, the precession rate is expected to be relatively small and uniform. In this case, the large attitude change near perigee can be readily accommodated by a discrete increment of the attitude right ascension, $\alpha$, and declination, $\delta$. That is, during each perigee passage $$\alpha \rightarrow \alpha + \Delta \alpha \qquad (32)$$

$$\delta \rightarrow \delta + \Delta \delta \qquad (33)$$

where $\Delta \alpha$ and $\Delta \delta$ are ground commanded, seasonally varying parameters which describe the net attitude change. In order to minimize the accumulation of error, it is assumed that the attitude is also reinitialized at the same time as the orbital state.

For the GEO orbit or the HEO orbit between rise and set, the relatively small and uniform attitude precession rate suggests that a linear expansion of the attitude parameters may be more appropriate. That is, $$\alpha(t) = \alpha_0 + \alpha'(t - t_o) \qquad (34)$$

$$\delta(t) = \delta_0 + \delta'(t - t_0) \qquad (35)$$

where $\alpha_0$ and $\delta_0$ represent initial values of the attitude right ascension and declination, and $\alpha'$ and $\delta'$ are ground commanded, seasonally varying coefficients which define the precession rate. Note that the reference time, $t_0$, is the same for the attitude as for the orbital state.

Hence, in addition to the seven orbital state parameters and reference time, initial values of the spin axis right ascension and declination and either the net change per orbit, $\Delta \alpha$ and $\Delta \delta$, or the precession rate parameters, $\alpha'$ and $\delta'$, (or both) are required to be transmitted to the spacecraft periodically.

At this time, it is not clear whether both of these forms will be required or whether the simple step approximation, Equations (32) and (33), will be adequate for all of the high earth orbit (HEO), low earth orbit (LEO) and geosynchronous orbit (GEO) cases.

After an update, the unit attitude vector is determined at 54 from the right ascension and declination by:

$$\hat{A} = \begin{bmatrix} \cos\alpha \cos\delta \\ \sin\alpha \cos\delta \\ \sin\delta \end{bmatrix} \qquad (36)$$

If the linear expansion, Equations (34) and (35), is required, then the interval between updates is expected to be on the order of 1 hour; otherwise, the attitude update is only executed during perigee passage.

The inertial position of the Sun at a specified time, t, is given at 56 by the following expressions, which provide an accuracy of approximately 0.01° for times within ±50 years of the epoch, $t_{0_s}$.

The mean anomaly, M, is given by an expression of the form, $$M = M_0 + n(t - t_{0_s}) \qquad (37)$$

The longitude of the Sun, $L_s$, is then given by $$L_s = L_0 + \omega_s(t - t_{0_s}) + e_1 \sin M + e_2 \sin 2M \qquad (38)$$

Finally, the unit Sun vector in GCI coordinates is given by:

$$\hat{S} = \begin{bmatrix} \cos L_s \\ \cos\epsilon \sin L_s \\ \sin\epsilon \sin L_s \end{bmatrix} \qquad (39)$$

where $\in$ is the obliquity of the ecliptic.

The epoch for the Sun ephemeris is $t_{0_s} = 12:00:00$ UT, Jan. 1, 2000 (note that this is not the same as for the orbital state). Specific values of the constants, $M_0$, n, $L_0$, $\omega_s$, $e_i$, and $\AA$, for this epoch are given in the following table.

| Sun Ephemeris Parameters | | |
|---|---|---|
| Parameter | Value | Units |
| M0 | 357.528 | deg |
| n | 0.9856003 | deg/day |
| $L_0$ | 280.460 | deg |
| $\omega_S$ | 0.9856474 | deg/day |
| $e_1$ | 1.915 | deg |
| $e_2$ | 0.020 | deg |
| $\epsilon$ | 23.439 | deg |

To insure the specified accuracy, the required update interval for the Sun vector is on the order of 15 minutes.

It is expected that the Sun ephemeris will not require reinitialization after start up. However, the parameters, $M_0$, $L_0$ and $t_{0_S}$, at least, should be reprogrammable through telemetry to insure flexibility.

For certain applications, it may be required to point at some location other than the nadir. In such a case, it is necessary to know the inertial position of the desired target. If the target is a given point on the surface of the Earth, then the inertial coordinates are determined at 58 as follows.

Let $\Phi$ and $\lambda$ denote the geodetic latitude and longitude of the specified point. Then, neglecting oblateness, the inertial right ascension, $\alpha_T$, and declination, $\delta_T$, of the target t time, t, are given by:

$$\alpha_T(t) = \alpha_G(t) + \lambda \qquad (40)$$

$$\alpha_T = \phi \qquad (41)$$

where $\alpha_G$ (t) is the right ascension of Greenwich.

The right ascension of Greenwich is given by an expression of the form, $$\alpha_G(t) = \alpha_G(t_{0_G}) + \Omega(t - t_{0_G}) \text{ (modulo } 360°) \qquad (42)$$

where $\Omega$=360.9856473 deg/day (=6.300388099 rad/day) is the spin rate of the Earth and $t_{0_G}$ is a reference time. The accuracy of this expression (27) is approximately 0.01° for times within ±25 years of the reference time.

It is convenient to choose the reference time in this case to be the same as for the sun ephemeris. For the selected reference, $t_{0_G} = t_{0_S} = 12{:}00{:}00$ UT, Jan. 1, 2000, $\alpha_G$ ($t_{0_G}$) =280.4606 deg.

The expression for the right ascension and declination, the inertial position of the target relative to the center of the Earth, $\vec{R}_T$, is given by:

$$\vec{R}_T = R_e \hat{u} = R_e \begin{bmatrix} \cos\alpha_T \cos\delta_T \\ \sin\alpha_T \cos\delta_T \\ \sin\delta_T \end{bmatrix} \qquad (43)$$

where $R_e$=6378.137 km is the equatorial radius of the Earth.

The target vector, $P_T$, a unit vector from the spacecraft toward the specified target, is given in inertial coordinates by:

$$\hat{P}_T = \frac{x_5 \hat{E} + R_e \hat{u}}{|x_5 \hat{E} + R_e \hat{u}|} \qquad (44)$$

where $$|x_5 \hat{E} + R_e \hat{u}| = \sqrt{x_5^2 + R_e^2 + 2x_5 R_e \cos\zeta} \qquad (45)$$

S and $\cos \zeta = \hat{E} \cdot \hat{u} = E_1 u_1 + E_2 u_2 + E_3 u_3$.

It should be noted that the target is visible to the spacecraft only if $\cos \zeta \leq -\cos \rho$, where $$\cos\rho = \sqrt{1 - (R_e/x_5)^2} \qquad (46)$$

Otherwise, the line of sight to the target point intersects the Earth.

The platform azimuth angle, $\Phi$, is determined at 60 by the Sun to Earth rotation angle about the attitude vector. Explicitly, $$\Phi = \Phi_0 + \text{Tan}_2^{-1} (\hat{A} \cdot (\hat{S} \times \hat{E}), \hat{S} \cdot \hat{E} - (\hat{S} \cdot \hat{A})(\hat{E} \cdot \hat{A})) \qquad (47)$$

where $\Phi_0$ is a constant which depends on the relative azimuth of the Sun sensor and platform reference position in spacecraft coordinates and $\text{Tan}_2^{-1}$ (y,x) computes the arc tangent (radians) of y/x in the range, $-\pi$ to $\pi$. In this equation (47), $\Phi$ is positive in the direction of spin, $\hat{A}$ is the unit attitude vector (36), $\hat{S}$ is the unit Sun vector (39) and $\hat{E}$ is the nadir vector (31). For completeness, the arguments of the arc tangent are written explicitly as:

$$\hat{A} \cdot (\hat{S} \times \hat{E}) = A_1(S_2 E_3 - S_3 E_2) + A_2(S_3 E_1 - S_1 E_3) + A_3(S_1 E_2 - S_2 E_1) \qquad (48)$$

$$\hat{S} \cdot \hat{E} - (\hat{S} \cdot \hat{A})(\hat{E} \cdot \hat{A}) = S_1 E_1 + S_2 E_2 + S_3 E_3 - (A_1 S_1 + A_2 S_2 + A_3 S_3)(A_1 E_1 + A_2 E_2 + A_3 E_3) \qquad (49)$$

If a target other than the nadir is required, $\hat{E}$ in these equations is replaced by $\hat{P}_T$, Equation (44).

The gimbal elevation angle, $\gamma$, of the Earth center relative to the spin plane is given by $$\gamma = \text{Sin}^{-1}(\hat{A} \cdot \hat{E}) = \text{Sin}^{-1}(A_1 E_1 + A_2 E_2 + A_3 E_3) \qquad (50)$$

In this equation, the elevation angle (radians) is positive toward the positive spin axis.

As before, if the target is other than the nadir, $\hat{E}$ in this equation is replaced by $\hat{P}_T$, Equation (44).

As shown in the flow diagram at 64, FIG. 3b, commands may be output immediately after computation or, optionally, output may be delayed until the spacecraft internal clock time approaches the same value as the time parameter corresponding to the updated orbital state. The latter option implies that the platform azimuth and gimbal elevation angles are commanded in discrete steps, while the former option allows for more uniform control.

In general, control is based on the desired and previous values of the control variables (and rates); in this case, platform azimuth and gimbal elevation. The specific control strategy to be implemented is not available at this time so that a detailed description is not possible. However, for reference, it may be noted that the rates required to achieve the desired platform azimuth and gimbal elevation angles at the designated time are given by:

$$\dot{\Phi} = \frac{\Phi - \Phi_{prev}}{t - t_{s/c}} \qquad (51)$$

$$\dot{\gamma} = \frac{\gamma - \gamma_{prev}}{t - t_{s/c}} \qquad (52)$$

where $\dot{\Phi}$ and $\dot{\gamma}$ are the platform azimuth and gimbal elevation rates, $\Phi$ and $\gamma$ are the desired azimuth and elevation angles at time, t, $\Phi_{prev}$ and $\gamma_{prev}$ are the previous values and $t_{s/c}$ is the spacecraft clock time at which the command is implemented.

The block 66 in the flow diagram, FIG. 3b, labeled "other processing" allow for spacecraft processor functions which are unrelated to the determination of platform azimuth or gimbal elevation. They are included in the diagram for completeness only.

Having thus described the present invention, many modifications thereto will become apparent to those skilled in the art to which it pertains without departing from the scope and spirit of the present invention as defined in the appended claims.

What is claimed is:

1. A method for controlling orbiting spacecraft payload pointing by determining spacecraft orbital position using quaternion representations of the orbital state, comprising:

uploading a plurality of parameters to an onboard processor including a plurality of quaternion elements;

inputting said uploaded parameters to a propagation algorithm;

calculating said propagation algorithm with said uploaded parameters for computing enhanced time of day vectors, wherein said calculating step comprises integration of an orbital state vector;

computing ground time of day angles from said enhanced time of day vectors; and adjusting payload pointing angle of the satellite.

2. The invention as defined in claim 1 wherein said calculating step comprises propagating an orbital state vector with a second order Runge-Kutta integration algorithm.

3. The invention as defined in claim 1 wherein said orbital state vector is a seven element vector.

4. The invention as defined in claim 3 wherein said orbital state vector comprises four quaternion elements representing inertial to orbital reference frames and a radial position element, a radial velocity element, and an angular rate element.

5. The invention as defined in claim 1 wherein said calculating comprises incrementing transverse components of spacecraft attitude at perigee.

6. The invention as defined in claim 1 wherein said calculating step comprises propagating the sun ephemeris every time of day update period.

7. The invention as defined in claim 1 wherein said calculating step comprises propagating the right ascension of Greenwich every time of day update period.

8. The invention as defined in claim 1 wherein said computing enhanced time of day vectors comprises determining a vector from spacecraft to earth center as a function of the elements of an orbital state vector.

9. The invention as defined in claim 1 wherein said computing enhanced time of day vectors comprises determining a vector from spacecraft to sun as a function of sun ephemeris.

10. The invention as defined in claim 1 wherein said computing enhanced time of day vectors comprises determining a vector from spacecraft to a ground station.

11. The invention as defined in claim 1 wherein said computing enhanced time of day vectors comprises determining a vector of spacecraft spin axis attitude vector as a function of transverse components of spacecraft attitude.

12. The invention as defined in claim 1 wherein said computing time of day angles comprises determining a SUN-TOD ANGLE as a function of at least one of spacecraft to earth center vector, spacecraft to sun vector, and a spacecraft spin axis attitude vector.

13. The invention as defined in claim 1 wherein said computing time of day angles comprises determining the ground pointed azimuth angle as a function of at least one of a spacecraft to earth center vector, a spacecraft spin axis attitude vector, and a spacecraft to a ground station vector.

14. The invention as defined in claim 1 wherein said computing time of day angles comprises determining the ground pointed elevation angle as a function of at least one of a spacecraft spin axis attitude vector and a spacecraft to ground vector.

15. The invention as defined in claim 1 wherein said computing time of day angles comprises determining an earth pointed elevation angle as a function of at least one of a spacecraft to earth center vector and a spacecraft spin axis attitude vector.

16. The invention as defined in claim 1 wherein said method comprises fault processing for comparing a quaternion normalization's deviation from unity with a commandable threshold.

17. The invention as defined in claim 1 wherein said payload is an antenna and said adjusting step comprises adjusting antenna pointing angle of the satellite.

* * * * *